(12) United States Patent
Ota et al.

(10) Patent No.: US 11,277,087 B2
(45) Date of Patent: Mar. 15, 2022

(54) THYRISTOR STARTER

(71) Applicant: TOSHIBA MITSUBISHI-ELECTRIC INDUSTRIAL SYSTEMS CORPORATION, Chuo-ku (JP)

(72) Inventors: Takahiro Ota, Chuo-ku (JP); Hironori Kawaguchi, Chuo-ku (JP); Hiroshi Ogino, Chuo-ku (JP); Yasuaki Matsumoto, Chuo-ku (JP); Akinobu Ando, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/059,744

(22) PCT Filed: Jan. 4, 2019

(86) PCT No.: PCT/JP2019/000009
§ 371 (c)(1),
(2) Date: Nov. 30, 2020

(87) PCT Pub. No.: WO2020/141569
PCT Pub. Date: Jul. 9, 2020

(65) Prior Publication Data
US 2021/0218358 A1 Jul. 15, 2021

(51) Int. Cl.
*H02P 27/06* (2006.01)
*H02M 7/48* (2007.01)
*H02P 1/46* (2006.01)

(52) U.S. Cl.
CPC .............. *H02P 27/06* (2013.01); *H02M 7/48* (2013.01); *H02P 1/46* (2013.01); *H02P 2207/05* (2013.01)

(58) Field of Classification Search
CPC .... H02P 1/16; H02P 1/04; H02P 1/163; H02P 1/18; H02P 1/24; H02P 1/26; H02P 1/265;
(Continued)

(56) References Cited

U.S. PATENT DOCUMENTS 4,746,850 A * 5/1988 Abbondanti ............ H02P 6/185
318/723
2015/0236622 A1 8/2015 Ogino et al.

FOREIGN PATENT DOCUMENTS

WO WO 2014/033849 A1 3/2014
WO WO 2018/235189 A1 12/2018

OTHER PUBLICATIONS

International Search Report dated Apr. 2, 2019 in PCT/JP2019/000009 (submitting English translation only), 1 pages.
(Continued)

*Primary Examiner* — Antony M Paul
(74) *Attorney, Agent, or Firm* — Oblon, McClelland, Maier & Neustadt, L.L.P.

(57) ABSTRACT

In a thyristor starter, an inverter converts DC power provided from a converter through a DC reactor into AC power having a variable frequency, and supplies the AC power to a synchronous machine. A controller controls the inverter based on a phase control angle. A voltage regulator regulates an induced voltage of the synchronous machine by supplying a field current to the synchronous machine. When a rotation speed of the synchronous machine exceeds a reference rotation speed during acceleration of the synchronous machine, the voltage regulator controls the field current such that the induced voltage increases with an increase in the rotation speed of the synchronous machine. The controller decreases a rate of increase in the phase control angle relative to the rotation speed of the synchronous machine, as (Continued)

compared with when the rotation speed of the synchronous machine is less than the reference rotation speed.

4 Claims, 7 Drawing Sheets

(58) Field of Classification Search
CPC ...... H02P 1/28; H02P 1/30; H02P 1/42; H02P 1/426; H02P 4/00; H02P 5/00; H02P 6/00; H02P 6/005; H02P 6/04; H02P 6/08; H02P 6/12; H02P 6/14; H02P 6/16; H02P 6/17; H02P 6/188; H02P 6/26; H02P 6/28; H02P 7/00; H02P 7/06; H02P 7/14; H02P 7/282; H02P 7/292; H02P 7/293; H02P 7/295; H02P 7/298; H02P 7/343; H02P 9/008; H02P 9/14; H02P 9/38; H02P 9/48; H02P 11/00; H02P 11/04; H02P 11/06; H02P 21/00; H02P 21/22; H02P 23/07; H02P 23/18; H02P 23/186; H02P 23/28; H02P 25/062; H02P 25/064; H02P 27/00; H02P 29/00; H02P 2101/00; H02P 2101/10; H02P 2101/15; H02P 2101/20; H02P 2201/13; H02P 27/06; H02P 27/04; H02P 2207/05; H02P 1/46; H02P 1/00; H02M 7/48

See application file for complete search history.

(56) References Cited

OTHER PUBLICATIONS

Written Opinion of the International Searching Authority dated Apr. 2, 2019 in PCT/JP2019/000009, (with English translation), # pages.
Japanese Office Action dated Feb. 24, 2021 in Japanese Patent Application No. 2019-560421 (with English translation), 7 pages.

* cited by examiner

THYRISTOR STARTER

TECHNICAL FIELD

The present invention relates to a thyristor starter.

BACKGROUND ART

A thyristor starter for starting a synchronous machine such as a power generator and an electric motor has been developed (see, for example, WO 2014/033849 (PTL 1)). The thyristor starter includes a converter that converts alternating current (AC) power into direct current (DC) power, a DC reactor that smooths the DC power, and an inverter that converts the DC power provided from the converter through the DC reactor into AC power having a variable frequency, and supplies the AC power to the synchronous machine. By controlling the AC power to be supplied to the synchronous machine, the synchronous machine in a stopped state can be started and driven at a predetermined rotation speed.

CITATION LIST

Patent Literature

PTL 1: WO 2014/033849

SUMMARY OF INVENTION

Technical Problem

In the thyristor starter described above, the inverter has at least six thyristors. By igniting the six thyristors two by two in order in synchronization with rotation of the synchronous machine, the inverter can supply three-phase AC power to the synchronous machine and increase the rotation speed of the synchronous machine.

Actually, however, due to the inductance of the synchronous machine, commutation of a thyristor is not performed instantaneously, and there is a current overlap period. Therefore, a reverse bias period of the thyristor is equal to a difference between a control lead angle and a commutation overlap angle. In order to ensure commutation, it is necessary that the reverse bias period of the thyristor is longer than an angle corresponding to a turn-off time of the thyristor. The difference between the control lead angle and the commutation overlap angle is also called a commutation margin angle, and a period corresponding to the commutation margin angle is also called a commutation margin time.

In the thyristor starter described above, the commutation margin time becomes shorter with an increase in the rotation speed of the synchronous machine. Thus, commutation of a thyristor may fail in a high rotation speed region of the synchronous machine.

The present invention has been made to solve the aforementioned problem, and an object thereof is to reliably perform, in a thyristor starter that starts a synchronous machine, commutation of a thyristor in a high rotation speed region of the synchronous machine.

Solution to Problem

According to an aspect of the present invention, a thyristor starter that starts a synchronous machine includes a converter, a DC reactor, an inverter, a controller, and a voltage regulator. The converter converts AC power into DC power. The DC reactor smooths the DC power. The inverter converts the DC power provided from the converter through the DC reactor into AC power having a variable frequency, and supplies the AC power to the synchronous machine. The controller controls the inverter based on a phase control angle. The voltage regulator regulates an induced voltage of the synchronous machine by supplying a field current to the synchronous machine. When a rotation speed of the synchronous machine exceeds a reference rotation speed during acceleration of the synchronous machine, the voltage regulator controls the field current such that the induced voltage increases with an increase in the rotation speed of the synchronous machine. The controller decreases a rate of increase in the phase control angle relative to the rotation speed of the synchronous machine, as compared with when the rotation speed of the synchronous machine is less than the reference rotation speed.

Advantageous Effects of Invention

According to the present invention, in the thyristor starter that starts the synchronous machine, commutation of a thyristor in a high rotation speed region of the synchronous machine can be reliably performed.

DESCRIPTION OF EMBODIMENTS

Hereinafter, an embodiment of the present invention will be described in detail with reference to the drawings. It should be noted that identical or corresponding parts in the drawings will be designated by the same reference numerals, and the description thereof will not be repeated.

Figure 1:
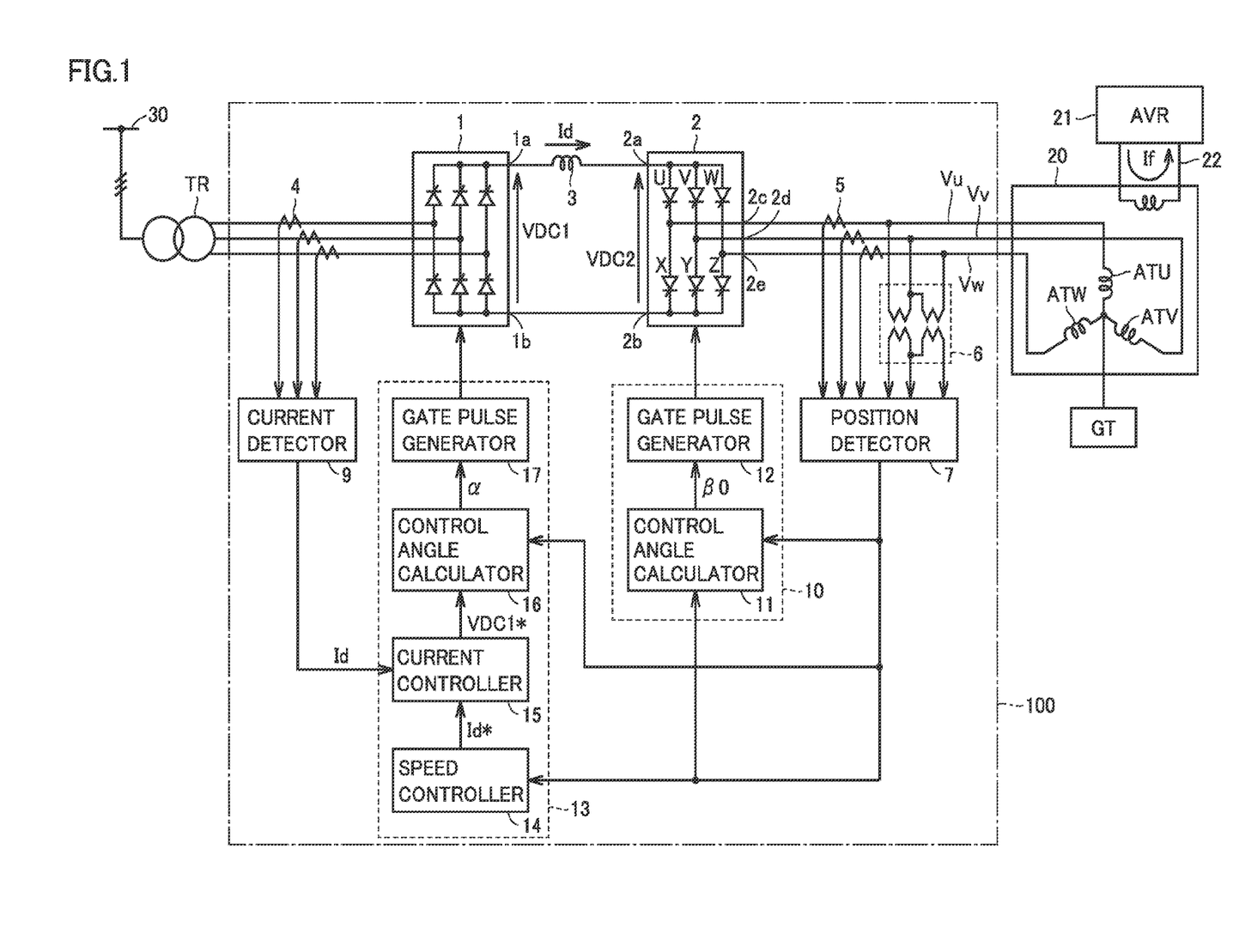
FIG. 1 is a schematic configuration diagram of a thyristor starter in accordance with an embodiment of the present invention.

FIG. 1 is a schematic configuration diagram of a thyristor starter in accordance with an embodiment of the present invention.

Referring to FIG. 1, a thyristor starter 100 is intended to accelerate a synchronous machine 20 in a stopped state to a synchronous speed, determine a synchronization state between a voltage of the synchronous machine and a voltage of a system to which synchronous machine 20 is to be connected, and incorporate synchronous machine 20 into the power system. Simultaneously with the incorporation, thyristor starter 100 is separated from synchronous machine 20. Thyristor starter 100 is also called a static frequency converter (SFC). Thyristor starter 100 during acceleration operates as a variable-speed drive device by means of a separately-excited inverter that commutates a current flowing through a thyristor using a counter-electromotive force of synchronous machine 20.

Synchronous machine 20 has a stator having armature windings ATU, ATV, and ATW, and a field winding 22. In the example of FIG. 1, synchronous machine 20 is coupled to, for example, a gas turbine GT in a thermal power station, and is rotationally driven by gas turbine GT.

Thyristor starter 100 is connected to a secondary side of a transformer TR. A primary side of transformer TR is connected to an AC power supply 30. Transformer TR transforms three-phase AC voltages supplied from AC power supply 30 into three-phase AC voltages having a predetermined voltage value, and provides them to thyristor starter 100.

Thyristor starter 100 includes a converter 1, a DC reactor 3, an inverter 2, and an AVR (automatic voltage regulator) 21. Converter 1 is a three-phase full-wave rectifier having at least six thyristors, and converts three-phase AC power from transformer TR into DC power having a variable voltage.

DC reactor 3 is connected between a positive output terminal 1a of converter 1 and a positive input terminal 2a of inverter 2. DC reactor 3 smooths a DC output current Id of converter 1. A negative output terminal 1b of converter 1 and a negative input terminal 2b of inverter 2 are connected with each other. Another DC reactor may be connected between negative output terminal 1b of converter 1 and negative input terminal 2b of inverter 2.

Three output terminals 2c, 2d, and 2e of inverter 2 are connected to three armature windings ATU, ATV, and ATW of synchronous machine 20, respectively. Inverter 2 is a three-phase separately-excited inverter having at least six thyristors U, V, W, X, Y, and Z. Inverter 2 converts the DC power provided from converter 1 through DC reactor 3 into AC power having a variable frequency, and supplies the AC power to synchronous machine 20.

AVR 21 supplies a field current If to field winding 22 of synchronous machine 20. AVR 21 controls field current If to be supplied to field winding 22 such that an AC voltage output by synchronous machine 20 is kept constant irrespective of the rotation speed of the gas turbine. Rotation of synchronous machine 20 is accelerated by supplying the AC power from inverter 2 to armature windings ATU, ATV, and ATW in a state where field current If is supplied to field winding 22. AVR 21 corresponds to one embodiment of the "voltage regulator".

Thyristor starter 100 further includes current transformers 4 and 5, a voltage detector 6, a position detector 7, a current detector 9, an inverter controller 10, and a converter controller 13.

Current transformer 4 detects three-phase AC currents flowing from transformer TR to converter 1, and provides signals indicating detected values to current detector 9. Based on the signals from current transformer 4, current detector 9 calculates DC current Id to be output from converter 1, and provides a signal indicating a calculated value thereof to converter controller 13. Specifically, current detector 9 has a full-wave rectification diode rectifier, and converts the detected three-phase AC currents into DC current Id.

Current transformer 5 detects currents flowing from inverter 2 to armature windings ATU, ATV, and ATW of synchronous machine 20, and provides signals indicating detected values to position detector 7.

Voltage detector 6 detects instantaneous values of three-phase AC voltages Vu, Vv, and Vw to be supplied from inverter 2 to synchronous machine 20, and provides signals indicating detected values to position detector 7. Specifically, voltage detector 6 detects two line voltages (in FIG. 1, an AC voltage Vu-v between the U phase and the V phase, and an AC voltage Vv-w between the V phase and the W phase), among line voltages of the three-phase AC voltages in armature windings ATU, ATV, and ATW of synchronous machine 20. By detecting at least two line voltages among AC voltage Vu-v between the U phase and the V phase, AC voltage Vv-w between the V phase and the W phase, and an AC voltage Vw-u between the W phase and the U phase in this manner, U-phase, V-phase, and W-phase AC voltages can be determined by calculation. The conversion from the line voltages to the phase voltages is performed in voltage detector 6 or position detector 7.

Position detector 7 detects the position of a rotor of synchronous machine 20 based on the signals from current transformer 5 and voltage detector 6, and provides a signal indicating a detected value to inverter controller 10 and converter controller 13.

Inverter controller 10 controls an ignition phase of inverter 2 based on the signal from position detector 7. Specifically, inverter controller 10 includes a control angle calculator 11 and a gate pulse generator 12.

Control angle calculator 11 calculates a phase control angle $\beta_0$ based on the detected position of the rotor of synchronous machine 20, and provides calculated phase control angle $\beta_0$ to gate pulse generator 12. Specifically, when control angle calculator 11 calculates a rotation speed of synchronous machine 20 based on the signal from position detector 7, control angle calculator 11 sets phase control angle $\beta_0$ based on the calculated rotation speed. Phase control angle $\beta_0$ is set such that the phase of an output phase current of inverter 2 leads relative to an induced voltage within synchronous machine 20.

It should be noted that an actual lead angle $\beta$ becomes smaller than phase control angle $\beta_0$ with an increase in phase current. In the following description, phase control angle $\beta_0$ is also referred to as a "set control lead angle $\beta_0$", and actual lead angle $\beta$ is also referred to as an "effective control lead angle $\beta$". It should be noted that control angle calculator 11 may calculate the rotation speed of synchronous machine 20 based on the signals from voltage detector 6, instead of the signal from position detector 7.

Gate pulse generator 12 generates a gate pulse (ignition command) to be provided to a gate of a thyristor of inverter 2, based on set control lead angle $\beta_0$ received from control angle calculator 11. Inverter controller 10 corresponds to one embodiment of the "controller".

Converter controller 13 controls an ignition phase of converter 1 based on the signal from position detector 7 and the signal from current detector 9. Specifically, converter controller 13 controls the ignition phase of converter 1 such that DC current Id to be output from converter 1 matches a current command value Id*.

Converter controller 13 includes a speed controller 14, a current controller 15, a control angle calculator 16, and a gate pulse generator 17. Speed controller 14 calculates the rotation speed of synchronous machine 20 based on the detected position of the rotor of synchronous machine 20. Speed controller 14 generates current command value Id*, which is a target value of DC current Id, based on the calculated rotation speed.

Current controller 15 calculates a deviation ΔId between current command value Id* and DC current Id, and generates a voltage command value VDC1* based on calculated deviation ΔId. Specifically, current controller 15 includes a proportional element (P), an integral element (I), and an adder. The proportional element multiplies deviation ΔId by a predetermined proportional gain, and outputs the result to the adder. The integral element integrates deviation ΔId with a predetermined integral gain, and outputs the result to the adder. The adder adds the outputs from the proportional element and the integral element to generate voltage command value VDC1*. Voltage command value VDC1* corresponds to a control command that defines a DC voltage VDC1 to be output by converter 1.

It should be noted that converter 1 controls DC voltage VDC1 to be higher than a DC voltage VDC2 on the side of the input terminals of inverter 2, by an amount of voltage drop caused by DC reactor 3. Thereby, DC current Id is controlled.

Control angle calculator 16 calculates a phase control angle α based on voltage command value VDC1* provided from current controller 15. Control angle calculator 16 provides calculated phase control angle α to gate pulse generator 17.

Gate pulse generator 17 generates a gate pulse (ignition command) to be provided to a gate of a thyristor of converter 1, based on phase control angle α received from control angle calculator 16. By switching-controlling converter 1 according to the gate pulse generated by gate pulse generator 17, DC current Id according to current command value Id* is output from converter 1.

Next, a commutation operation of inverter 2 will be described using FIG. 2.

Figure 2:
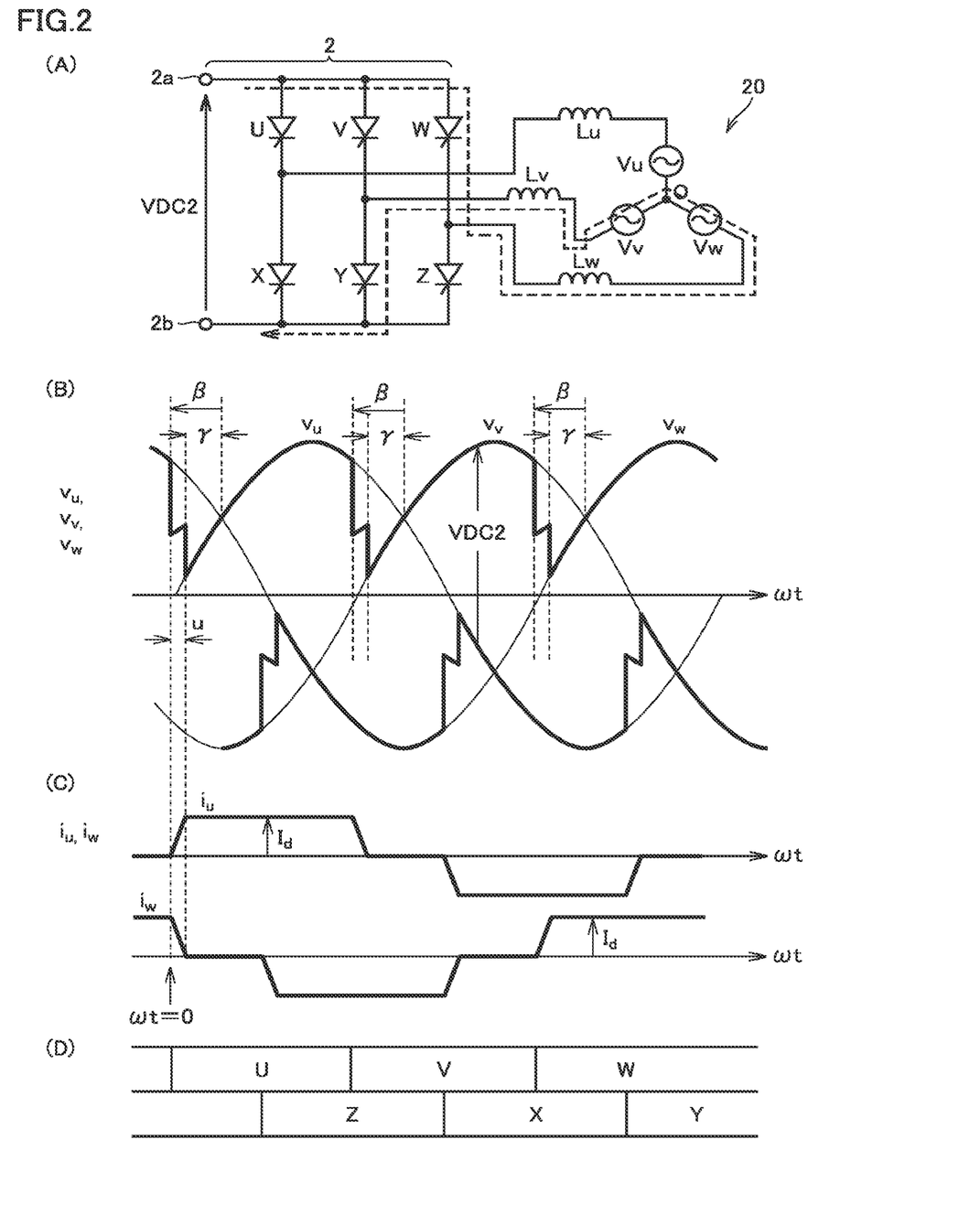
FIG. 2 is a time chart schematically showing a commutation operation of an inverter.

FIG. 2 is a time chart schematically showing a commutation operation of inverter 2. FIG. 2(A) is a circuit diagram showing a current actually flowing through inverter 2. Synchronous machine 20 has three-phase inductance components Lu, Lv, and Lw. FIG. 2(B) shows terminal voltages (three-phase AC voltages) Vu, Vv, and Vw of synchronous machine 20, and DC voltage VDC2 that appears between input terminals 2a and 2b of inverter 2. FIG. 2(C) shows currents iw and iu flowing through inverter 2. FIG. 2(D) shows conducting thyristors among six thyristors U, V, W, X, Y, and Z of inverter 2.

In FIG. 2(B), a point where line voltages Vu-v, Vv-w, and Vw-u are 0 V is a reference point of effective control lead angle β, and β=0° holds at the reference point. At a time when the phase leads from the reference point by a desired angle, an ignition command (gate pulse) is provided to a predetermined thyristor. For example, a gate pulse is provided to thyristor V while thyristor U is conducting, and then a gate pulse is provided to thyristor W while thyristor V is conducting. Similarly, a gate pulse is provided to thyristor X while thyristor Z is conducting, and then a gate pulse is provided to thyristor Y while thyristor X is conducting.

According to transition of conducting thyristors, line voltages Vu-v, Vv-w, and Vw-u of synchronous machine 20 sequentially appear between input terminals 2a and 2b of inverter 2, as DC voltage VDC2. Inverter controller 10 can control a path for a current flowing through synchronous machine 20, by igniting six thyristors U, V, W, X, Y, and Z two by two in order according to rotation of synchronous machine 20.

Actually, however, it is not possible to instantaneously extinguish a conducting thyristor in response to a gate pulse. Due to inductance components Lu, Lv, and Lw of synchronous machine 20, for a finite period, there occurs a period in which both of a thyristor which has been conducting until just before and a thyristor which will be conducting become conductive. This period is called a "commutation overlap time", and an angle corresponding to the commutation overlap time is called a "commutation overlap angle u".

In FIG. 2(B), even when a gate pulse is provided to thyristor U at ωt=0 while thyristors W and Y are conducting at ωt<0, both thyristors W and U continue conducting during the commutation overlap time due to the influence of inductance components Lv and Lw of synchronous machine 20. Therefore, a reverse bias period of the thyristor is equal to a difference between effective control lead angle β and commutation overlap angle u, as represented by the following equation (1).

$$\gamma = \beta - u \qquad (1)$$

In order to ensure commutation, it is necessary that the reverse bias period of the thyristor is longer than an angle corresponding to a turn-off time of the thyristor. This γ is also called a "commutation margin angle", and a period corresponding to the commutation margin angle is also called a "commutation margin time". When the turn-off time of the thyristor is defined as $t_{off}$, commutation margin angle γ should be more than or equal to $\omega t_{off}$.

Next, a basic operation of thyristor starter 100 will be described using FIG. 3.

Figure 3:
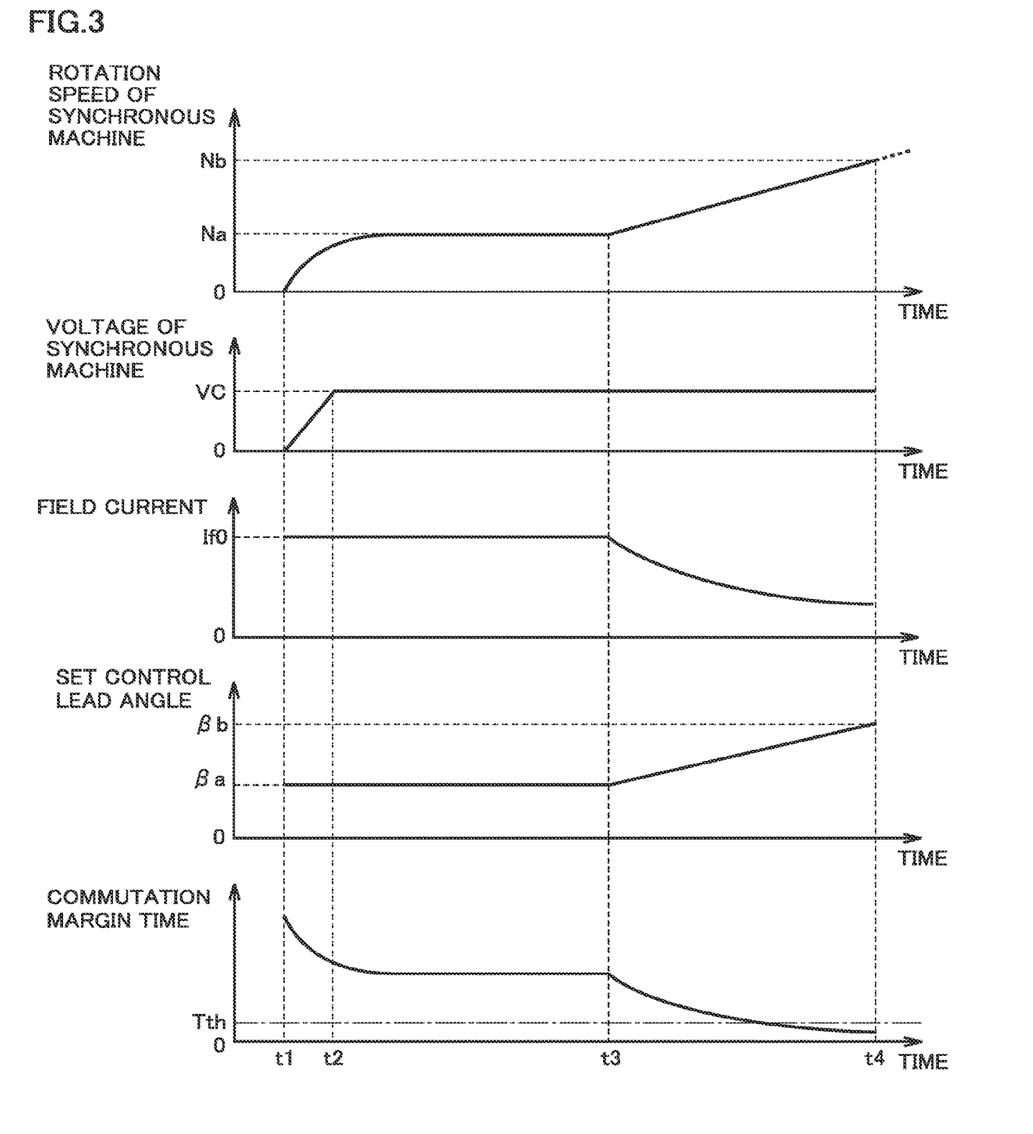
FIG. 3 is a time chart showing a basic operation of the thyristor starter.

FIG. 3 is a time chart showing a basic operation of thyristor starter 100. FIG. 3 shows the rotation speed of synchronous machine 20, an effective value of a terminal voltage of synchronous machine 20, the field current, the set control lead angle, and the commutation margin time of the thyristor in inverter 2.

When thyristor starter 100 starts at a time t1, thyristor starter 100 accelerates synchronous machine 20 from a completely stopped state to a predetermined rotation speed Na.

When synchronous machine 20 in the stopped state is started at time t1, AVR 21 supplies constant field current If to field winding 22 (If=If0). Due to constant field current If, a constant field magnetic flux is generated in the rotor of synchronous machine 20. By accelerating synchronous machine 20 in this state, the magnitude (effective value) of the induced voltage generated within synchronous machine 20 increases together with the rotation speed of synchronous machine 20.

When the effective value of the terminal voltage of synchronous machine 20 reaches a predetermined voltage VC at a time t2, AVR 21 maintains field current If to be supplied to field winding 22 at a constant value while the rotation speed of synchronous machine 20 is constant.

It should be noted that, while the rotation speed of synchronous machine 20 ranges from 0 to predetermined rotation speed Na, set control lead angle $\beta_0$ is maintained at a constant value βa in spite of change in rotation speed. The effective value of the terminal voltage of synchronous machine 20 increases linearly from 0 V to VC. Rotation speed Na is set to, for example, about 20% of a rated speed of gas turbine GT.

When the rotation speed of synchronous machine 20 reaches Na, a fuel is supplied to gas turbine GT and gas turbine GT is ignited at a time t3. After ignition, thyristor starter 100 assists speeding-up of gas turbine GT. Thus, acceleration of the rotation speed of synchronous machine 20 is started at time t3.

At and after time t3, AVR 21 decreases field current If to be supplied to field winding 22. Thereby, the effective value of the terminal voltage of synchronous machine 20 is maintained at constant voltage VC in spite of change in rotation speed.

While the rotation speed of synchronous machine 20 ranges from Na to a predetermined rotation speed Nb, set control lead angle $\beta_0$ increases linearly from a minimum value $\beta a$ to a maximum value $\beta b$, at a constant rate of increase, according to the rotation speed. In the specification of the present application, the rate of increase in set control lead angle $\beta_0$ indicates a rate of an increased amount $\Delta\beta_0$ of set control lead angle $\beta_0$ relative to an increased amount $\Delta N$ of a rotation speed N of synchronous machine 20 ($\Delta\beta_0/\Delta N$).

By linearly increasing set control lead angle $\beta_0$ at a constant rate of increase according to an increase in the rotation speed as described in PTL 1, an increase in DC voltage VDC2 in the commutation overlap time can be suppressed, as compared with a configuration in which set control lead angle $\beta_0$ is kept constant in spite of change in rotation speed.

It should be noted that, although not shown, when the rotation speed exceeds Nb, set control lead angle $\beta_0$ is maintained at maximum value $\beta b$. Rotation speed Nb is set to, for example, about 70% of the rated speed of gas turbine GT. When the rotation speed of synchronous machine 20 reaches Nb at a time t4, thyristor starter 100 is separated from synchronous machine 20.

In a series of operations performed by thyristor starter 100, at and after time t1, the commutation margin time gradually becomes shorter according to the rotation speed of synchronous machine 20, due to the influence of an increased amount in the commutation overlap time. In particular, when acceleration of synchronous machine 20 is started at time t3, the commutation margin time becomes shorter with an increase in the rotation speed of synchronous machine 20.

In the commutation margin time, there is a threshold time Tth at which the thyristor cannot commutate. Threshold time Tth is determined by turn-off time $t_{off}$ of the thyristor. In the example of FIG. 3, the commutation margin time becomes lower than threshold time Tth before time t4. Thus, the thyristor may have a commutation failure.

Accordingly, in thyristor starter 100 in accordance with the present embodiment, a control configuration of thyristor starter 100 capable of securing the commutation margin time of inverter 2 even when the rotation speed of synchronous machine 20 becomes higher is provided.

Figure 4:
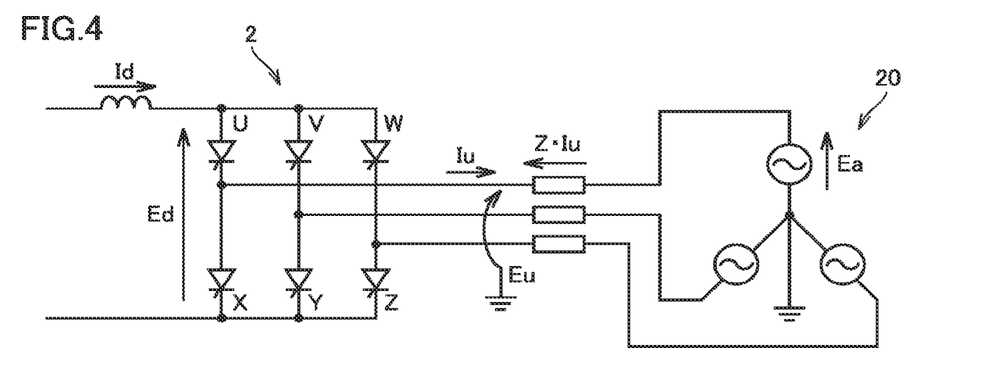
FIG. 4 is a main circuit configuration diagram of the inverter and a synchronous machine.

It should be noted that, in the specification of the present application, in order to describe the control configuration of thyristor starter 100 in accordance with the present embodiment, voltages and currents of inverter 2 and synchronous machine 20 are defined as shown in FIG. 4. In a main circuit configuration diagram of inverter 2 and synchronous machine 20 shown in FIG. 4, Id indicates a current flowing through DC reactor 3, and Ed indicates a DC voltage between input terminals 2a and 2b of inverter 2 (corresponding to VDC2 of FIG. 1). Iu indicates a U-phase current of three-phase AC currents output by inverter 2, and Eu indicates a U-phase voltage of three-phase AC voltages output by inverter 2. Z indicates an impedance for one phase of synchronous machine 20, and Ea indicates an induced voltage generated within synchronous machine 20. It should be noted that, concerning Z, for ease of description, a resistance component in the impedance for one phase is considered as negligible and thus is ignored, and it is assumed that Z has a reactance X only.

Figure 5:
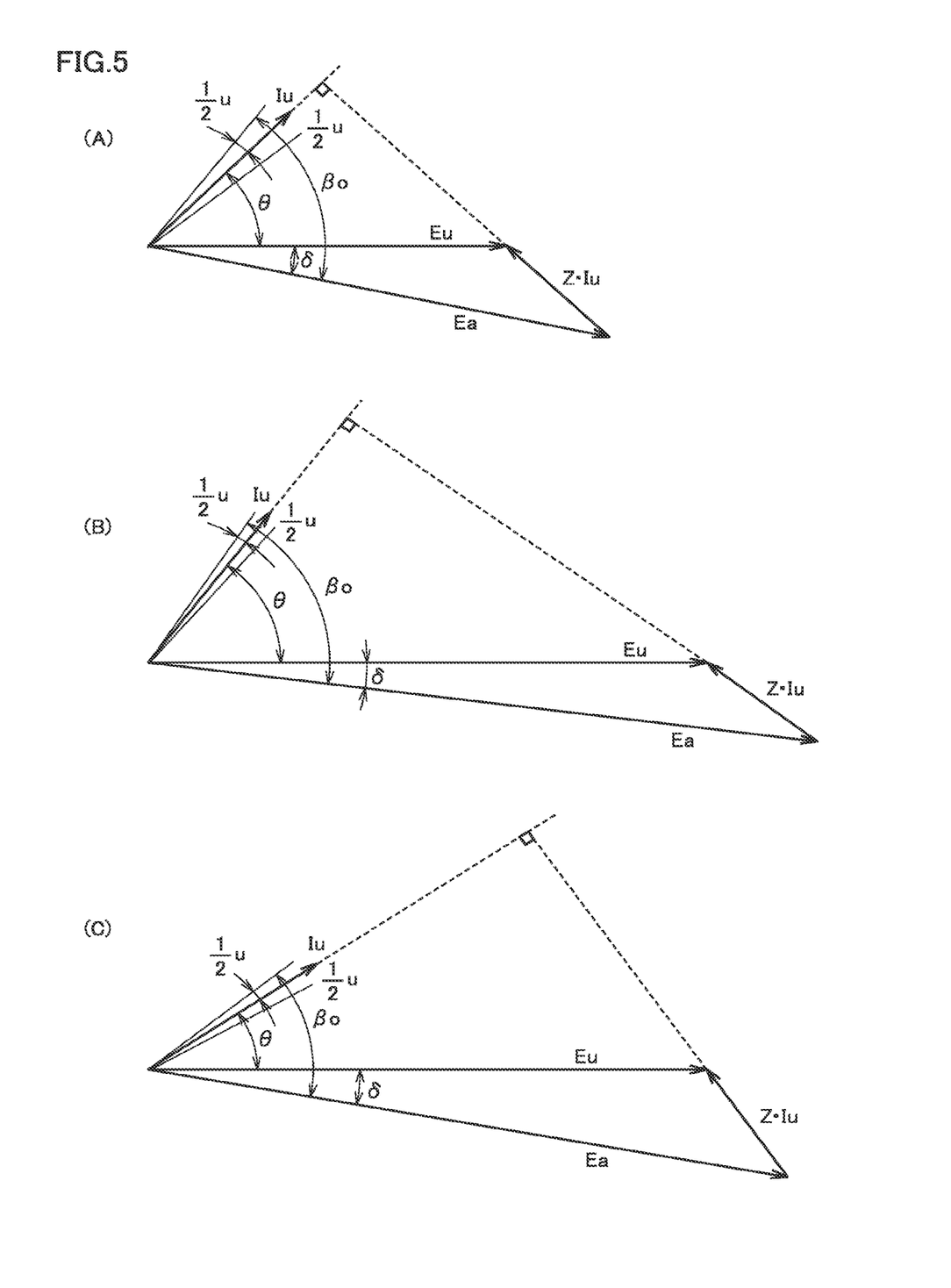
FIG. 5 shows vector diagrams of the thyristor starter and the synchronous machine.

FIG. 5(A) is a vector diagram depicted based on U-phase voltage Eu of thyristor starter 100. As shown in FIG. 5(A), U-phase current Iu of inverter 2 leads U-phase voltage Eu of inverter 2 by a phase angle $\theta$. Phase angle $\theta$ is a power-factor angle.

Induced voltage Ea within synchronous machine 20 during operation lags U-phase voltage Eu by a phase angle $\delta$. Phase angle $\delta$ is a load angle. Z●Iu has the magnitude of a product X●Iu of reactance X and U-phase current Iu, and has a phase difference of $\pi/2$ from Iu.

When synchronous machine 20 is operated at set control lead angle $\beta_0$, phases of inducted voltage Ea of synchronous machine 20 and U-phase current Iu can be considered such that Iu leads by $\beta_0$ and is fixed. U-phase voltage Eu during load operation is represented by the following equation (2).

$$Eu = Ea + X \times Iu \qquad (2)$$

Actually, however, a current waveform has a trapezoidal wave-like shape as shown in FIG. 2 due to commutation overlap angle u, and topologically, the phase of Iu lags by u/2.

A phase angle $\beta_0-\delta$ obtained by subtracting load angle $\delta$ from set control lead angle $\beta_0$ serves as effective control lead angle $\beta$. A phase angle $\beta-u/2$ obtained by subtracting $u/2$ from effective control lead angle $\beta$ serves as power-factor angle $\theta$.

$$\beta = \beta_0 - \delta \qquad (3)$$

$$\theta = \beta - \tfrac{1}{2}u \qquad (4)$$

As represented by equation (1), a phase angle $\beta-u$ obtained by subtracting commutation overlap angle u from effective control lead angle $\beta$ serves as commutation margin angle $\gamma$ ($\gamma=\beta-u$). As described above, the commutation margin time corresponding to commutation margin angle $\gamma$ becomes shorter with an increase in the rotation speed of synchronous machine 20, and thus the thyristor may cause a commutation failure.

Here, induced voltage Ea of synchronous machine 20 during operation is provided as $Ea = K\phi\omega$, where K is a constant, $\phi$ is a composite magnetic flux, and $\omega$ is an angular speed. When field current If is increased in AVR 21, the field magnetic flux generated in synchronous machine 20 is increased. By increasing $\phi$ by the increase in the field magnetic flux, induced voltage Ea of synchronous machine 20 can be increased as shown in FIG. 5(B).

In a vector diagram of FIG. 5(B), it is assumed that the rotation speed of synchronous machine 20 is the same as that in the vector diagram of FIG. 5(A). In the vector diagram of FIG. 5(B), set control lead angle $\beta_0$ has the same magnitude as that in FIG. 5(A). Further, phase current Iu and Z●Iu in FIG. 5(B) also have the same magnitudes as those in in FIG. 5(A).

In FIG. 5(B), by increasing induced voltage Ea without changing the magnitude of Z●Iu, U-phase voltage Eu is also increased. On the other hand, load angle $\delta$ is smaller than that in FIG. 5(A). Since set control lead angles $\beta_0$ are equal to each other, effective control lead angle $\beta(=\beta_0-\delta)$ in FIG. 5(B) is larger than that in FIG. 5(A) as a result.

In inverter 2, commutation overlap angle u is provided by the following equation (5).

$$u = \beta - \cos^{-1}\left(\cos\beta + \frac{\sqrt{2}\, XId}{Eu}\right) \qquad (5)$$

According to equation (5), as U-phase voltage Eu output by inverter 2 increases, commutation overlap angle u decreases. Thus, commutation overlap angle u in FIG. 5(B) is smaller than that in FIG. 5(A).

As described above, when induced voltage Ea of synchronous machine 20 is increased with set control lead angle β being fixed, effective control lead angle β increases, and commutation overlap angle u decreases. Since this can increase commutation margin angle γ, the commutation margin time can be secured even in a high rotation speed region of synchronous machine 20.

On the other hand, however, in FIG. 5(B), power-factor angle θ increases with an increase in effective control lead angle β. The increase in power-factor angle θ causes a decrease in output power of thyristor starter 100. Specifically, DC voltage Ed is provided by the following equation (6).

$$Ed = \frac{3\sqrt{2}}{\pi} \times \sqrt{3} \, Eu \times \cos\beta \tag{6}$$

It should be noted that equation (6) can be rewritten as the following equation (7), using equation (4).

$$Ed = \frac{3\sqrt{2}}{\pi} \times \sqrt{3} \, Eu \times \cos\left(\theta + \frac{1}{2}u\right) \tag{7}$$

Since output power of inverter 2 is equal to input power of inverter 2 under the law of conservation of energy, the output power can be represented by a product Ed×Id of DC voltage Ed and DC current Id. According to equation (7), as power-factor angle θ increases, DC voltage Ed decreases. Thus, the output power of inverter 2 may decrease.

Accordingly, in the present embodiment, as induced voltage Ea of synchronous machine 20 increases, set control lead angle $\beta_0$ is decreased in a range in which commutation margin angle γ can be secured, as shown in FIG. 5(C). This suppresses a decrease in DC voltage Ed due to an increase in power-factor angle θ.

In a vector diagram of FIG. 5(C), it is assumed that the rotation speed of synchronous machine 20 is the same as those in the vector diagrams of FIGS. 5(A) and 5(B). In the vector diagram of FIG. 5(C), induced voltage Ea of synchronous machine 20 has the same magnitude as that in FIG. 5(B). Further, U-phase current Iu of inverter 2 and Z●Iu in FIG. 5(C) also have the same magnitudes as those in in FIG. 5(B). In this state, set control lead angle $\beta_0$ is decreased as compared with that in FIG. 5(B). By decreasing set control lead angle $\beta_0$, effective control lead angle β can be decreased, and as a result, power-factor angle θ can also be decreased.

On the other hand, when set control lead angle $\beta_0$ is decreased as shown in FIG. 5(C), commutation margin angle γ also decreases, and increasing induced voltage Ea of synchronous machine 20 may become meaningless. Therefore, it is necessary to adjust set control lead angle $\beta_0$ in a range in which commutation margin angle γ is more than or equal to $\omega t_{off}$ ($t_{off}$ is the turn-off time of the thyristor).

It should be noted that, according to equation (6), ideally, if the product of U-phase voltage Eu and cos β (a cosine function of effective control lead angle β) can be maintained at a constant value, DC voltage Ed can be maintained at a constant value. Therefore, it is preferable to adjust set control lead angle $\beta_0$ according to the rotation speed of synchronous machine 20 such that γ≥$\omega t_{off}$ holds and Eu×cos β is constant. This can suppress a decrease in DC voltage Ed (that is, a decrease in the output power of thyristor starter 100) while securing the commutation margin time.

Figure 6:
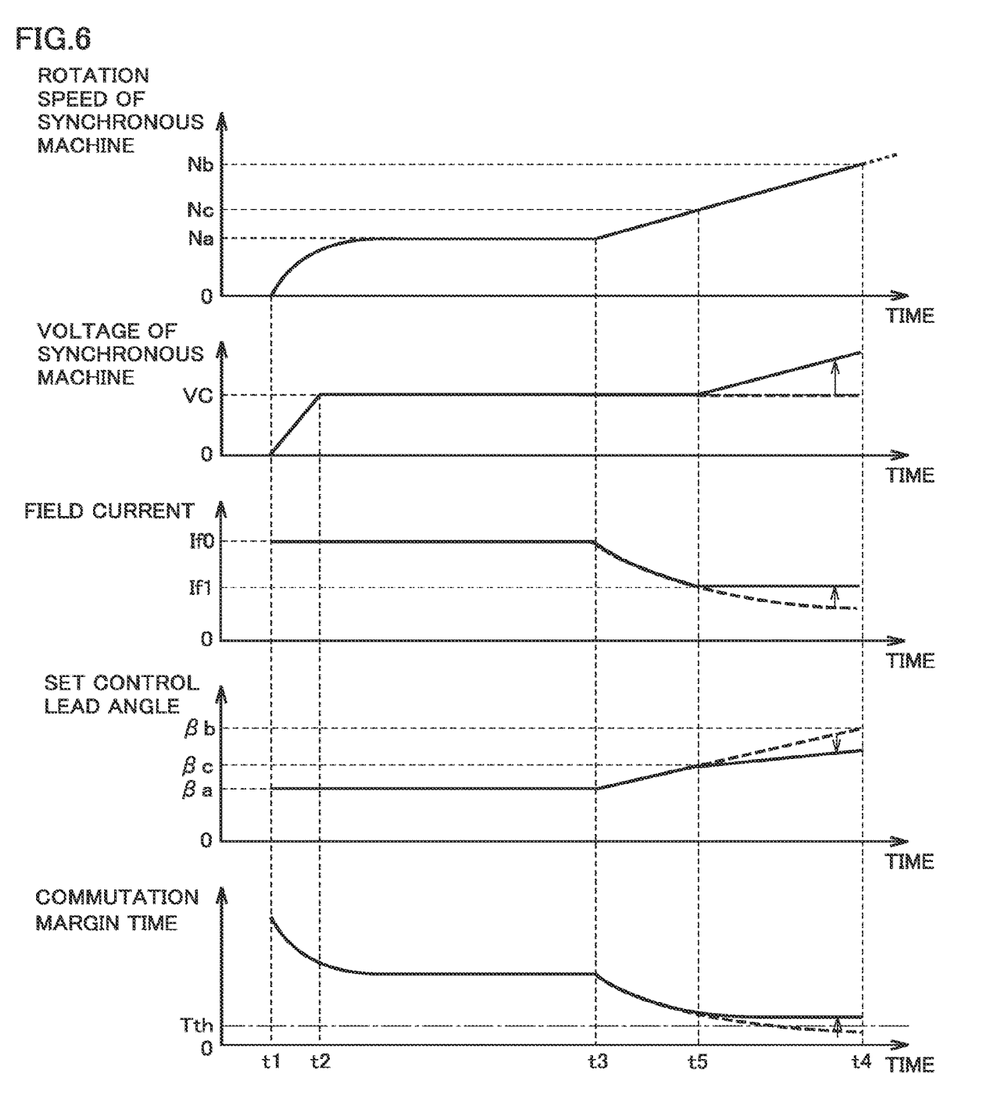
FIG. 6 is a time chart showing an operation of the thyristor starter according to the present embodiment.

FIG. 6 is a time chart showing an operation of thyristor starter 100 in accordance with the present embodiment. FIG. 6 shows the rotation speed of synchronous machine 20, the effective value of the terminal voltage of synchronous machine 20, the field current, the set control lead angle, and the commutation margin time.

The waveform of the rotation speed of synchronous machine 20 shown in FIG. 6 is the same as that shown for the basic operation in FIG. 3. In FIG. 6, the waveforms of the effective value of the terminal voltage of synchronous machine 20, the field current, the set control lead angle, and the commutation margin time shown in FIG. 3 are indicated by broken lines.

In the time chart of FIG. 6, the waveforms of the effective value of the terminal voltage, the field current, the set control lead angle, and the commutation margin time at and after time t3 are different from those in the time chart of FIG. 3. Specifically, when gas turbine GT is ignited at time t3, acceleration of synchronous machine 20 is started. When the rotation speed of synchronous machine 20 reaches a preset reference rotation speed Nc at a time t5, AVR 21 increases the effective value of induced voltage Ea of synchronous machine 20 by controlling field current If to be supplied to field winding 22 of synchronous machine 20, where Na<Nc<Nb holds.

Specifically, AVR 21 controls field current If such that the effective value of the induced voltage increases with an increase in the rotation speed of synchronous machine 20. In the example of FIG. 6, AVR 21 maintains field current If at a constant value If1 at and after time t5. Thereby, the effective value of the terminal voltage of synchronous machine 20 gradually increases from VC at and after time t5.

It should be noted that reference rotation speed Nc is set to a rotation speed obtained when the commutation margin time becomes longer than threshold time Tth in a case where set control lead angle $\beta_0$ is increased from βa according to the rotation speed while maintaining the effective value of the terminal voltage of synchronous machine 20 at constant value VC.

In thyristor starter 100, at and after time t3, the commutation margin time becomes shorter with an increase in the rotation speed of synchronous machine 20. However, at and after time t5, a decrease in the commutation margin time is suppressed. This is because effective control lead angle β is increased by increasing the induced voltage of synchronous machine 20 with an increase in the rotation speed of synchronous machine 20. On the other hand, as shown in FIG. 5(B), when set control lead angle $\beta_0$ is constant, power-factor angle θ also increases together with effective control lead angle β, which may cause a decrease in the output power of thyristor starter 100.

Accordingly, thyristor starter 100 decreases the rate of increase $\Delta\beta_0/\Delta N$ in set control lead angle $\beta_0$ at and after time t5, on condition that the commutation margin time is longer than threshold time Tth. Specifically, in inverter controller 10, control angle calculator 11 decreases the rate of increase $\Delta\beta_0/\Delta N$ in set control lead angle $\beta_0$ while the rotation speed of synchronous machine 20 ranges from Nc to Nb, as compared with the rate of increase $\Delta\beta_0/\Delta N$ in set control lead angle $\beta_0$ while the rotation speed of synchronous machine 20 ranges from Na to Nc. Accordingly, when attention is paid to the waveform of set control lead angle $\beta_0$ at and after time t5, set control lead angle $\beta_0$ at the same rotation speed is smaller in FIG. 6 (indicated by the solid line) than that in FIG. 3 (indicated by the broken line).

In the example of FIG. 6, while the rotation speed ranges from Nc to Nb, set control lead angle $\beta_0$ increases linearly at a constant rate of increase $\Delta\beta_0/\Delta N$, according to the rotation speed. Instead of the example of FIG. 6, the rate of increase $\Delta\beta_0/\Delta N$ in set control lead angle $\beta_0$ may be changed a plurality of times according to the rotation speed, while the rotation speed ranges from Nc to Nb. For example, the rate of increase $\Delta\beta_0/\Delta N$ in set control lead angle $\beta_0$ may be gradually decreased according to the rotation speed, while the rotation speed ranges from Nc to Nb.

However, as described in FIG. 5(C), by setting set control lead angle $\beta_0$ based on the terminal voltage (phase voltage Eu) of synchronous machine 20 such that the product of the terminal voltage and cos $\beta$ has a constant value, the DC voltage that appears between input terminals 2a and 2b of inverter 2 (corresponding to VDC2 in FIG. 1) can be maintained at a constant value, irrespective of the rotation speed of synchronous machine 20. As a result, a decrease in the output power of thyristor starter 100 can be suppressed.

Figure 7:
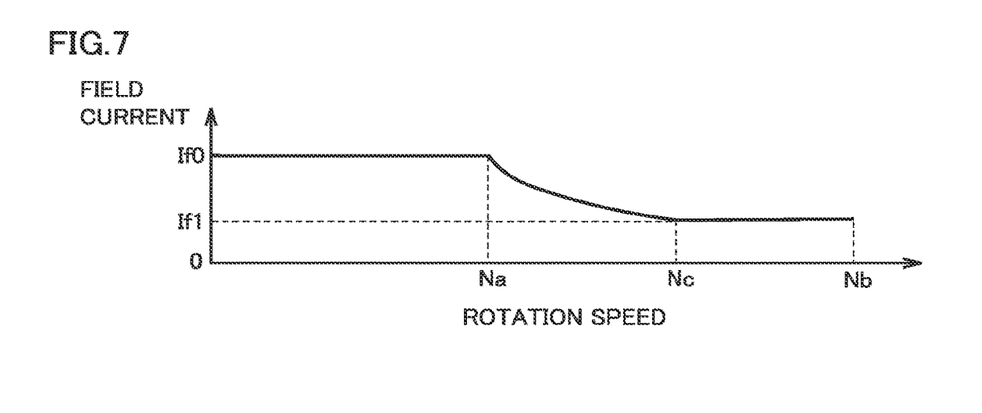
FIG. 7 is a diagram showing the relation between a rotation speed of the synchronous machine and a field current.

It should be noted that control of the induced voltage of synchronous machine 20 described above can determine beforehand the relation between the rotation speed of synchronous machine 20 and an effective value of an optimal induced voltage (field current If), and store beforehand the correspondence relation therebetween as a map or a relational expression in AVR 21. FIG. 7 is a diagram showing an example of the relation between the rotation speed of synchronous machine 20 and field current If. In FIG. 7, the axis of ordinates represents field current If, and the axis of abscissas represents the rotation speed of synchronous machine 20. In the example of FIG. 7, while the rotation speed ranges from Na to reference rotation speed Nc, field current If decreases according to the rotation speed. When the rotation speed exceeds reference rotation speed Nc, field current If is maintained at constant value If1.

Figure 8:
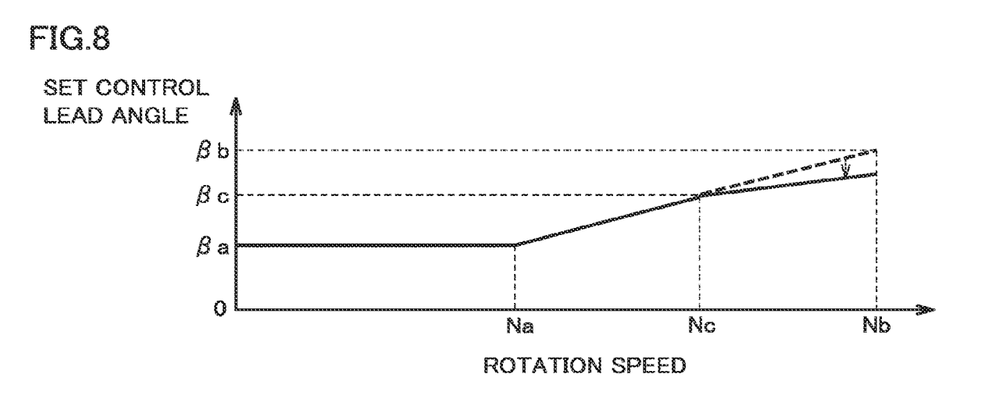
FIG. 8 is a diagram showing the relation between the rotation speed of the synchronous machine and a set control lead angle.

Similarly, control of set control lead angle $\beta_0$ can determine beforehand the relation between the rotation speed of synchronous machine 20 and optimal set control lead angle $\beta_0$, and store beforehand the correspondence relation therebetween as a map or a relational expression in inverter controller 10. FIG. 8 is a diagram showing an example of the relation between the rotation speed of synchronous machine 20 and set control lead angle $\beta_0$. It should be noted that the broken line in the drawing indicates the relation between the rotation speed of synchronous machine 20 and set control lead angle $\beta_0$ shown in FIG. 3, for comparison.

In the example of FIG. 8, while the rotation speed ranges from Na to reference rotation speed Nc, set control lead angle $\beta_0$ increases linearly from $\beta a$ to $\beta c$ at a first rate of increase $\Delta\beta_0/\Delta N$, according to the rotation speed. While the rotation speed ranges from reference rotation speed Nc to Nb, set control lead angle $\beta_0$ increases linearly from $\beta c$ to $\beta b$ at a second rate of increase $\Delta\beta_0/\Delta N$, according to the rotation speed. It should be noted that the second rate of increase is smaller than the first rate of increase.

Accordingly, when the rotation speed of synchronous machine 20 reaches reference rotation speed Nc, AVR 21 and inverter controller 10 can refer to the map or the relational expression based on the rotation speed of synchronous machine 20, and set field current If and set control lead angle $\beta_0$, respectively.

As described above, according to the thyristor starter in accordance with the embodiment of the present invention, in the high rotation speed region of the synchronous machine, the induced voltage of the synchronous machine is increased with an increase in the rotation speed of the synchronous machine, and the rate of increase in the set control lead angle in the inverter is decreased as compared with that in a low rotation speed region. Thereby, the commutation margin time of the thyristor in the inverter can be secured while suppressing a decrease in the output power of the thyristor starter.

Further, according to the thyristor starter in accordance with the present embodiment, since the control of the induced voltage and the set control lead angle described above is performed only in the high rotation speed region in which the commutation margin time becomes shorter, such control does not affect the low rotation speed region in which a large fault current may be generated and the current overload capacity of a thyristor is a concern. Furthermore, since DC voltage Ed can be maintained at a constant value, converter 1 can be prevented from being affected.

It should be noted that, although the embodiment described above has described a case where synchronous machine 20 is a power generator rotationally driven by a gas turbine in a thermal power station, synchronous machine 20 is not limited thereto, and may be a synchronous machine used in a general industrial field.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: converter; 2: inverter; 3: DC reactor; 4, 5: current transformer; 6: voltage detector; 7: position detector; 9: current detector; 10: inverter controller; 11, 16: control angle calculator; 12, 17: gate pulse generator; 13: converter controller; 14: speed controller; 15: current controller; 20: synchronous machine; 21: AVR; 22: field winding; 30: AC power supply; 100: thyristor starter; ATU, ATV, ATW: armature winding; GT: gas turbine; U, V, W, X, Y, Z: thyristor.

The invention claimed is:

1. A thyristor starter that starts a synchronous machine, the thyristor comprising:
a converter that converts AC power into DC power;
a DC reactor that smooths the DC power;
an inverter that converts the DC power provided from the converter through the DC reactor into AC power having a variable frequency, and supplies the AC power to the synchronous machine;
a controller that controls the inverter based on a phase control angle; and
a voltage regulator that regulates an induced voltage of the synchronous machine by supplying a field current to the synchronous machine, wherein
when a rotation speed of the synchronous machine exceeds a reference rotation speed during acceleration of the synchronous machine,
the voltage regulator controls the field current such that the induced voltage increases with an increase in the rotation speed of the synchronous machine, and
the controller decreases a rate of increase in the phase control angle relative to the rotation speed of the synchronous machine, as compared with when the rotation speed of the synchronous machine is less than the reference rotation speed, and
the controller further sets the phase control angle according to the rotation speed of the synchronous machine such that a DC voltage that appears at an input terminal of the inverter is constant in spite of change in the rotation speed of the synchronous machine.

2. The thyristor starter according to claim 1, wherein, when the rotation speed of the synchronous machine exceeds the reference rotation speed during acceleration of the synchronous machine, the controller sets the phase control angle based on a terminal voltage of the synchronous machine such that a product of the terminal voltage of the synchronous machine and a cosine function of an effective phase control lead angle of the synchronous machine has a constant value.

3. The thyristor starter according to claim 1, wherein, when the rotation speed of the synchronous machine exceeds the reference rotation speed during acceleration of the synchronous machine, the controller sets the phase control angle according to the rotation speed of the synchronous machine such that a commutation margin time of a thyristor in the inverter is longer than a turn-off time of the thyristor in spite of change in the rotation speed of the synchronous machine.

4. The thyristor starter according to claim 2, wherein, when the rotation speed of the synchronous machine exceeds the reference rotation speed during acceleration of the synchronous machine, the controller sets the phase control angle according to the rotation speed of the synchronous machine such that a commutation margin time of a thyristor in the inverter is longer than a turn-off time of the thyristor in spite of change in the rotation speed of the synchronous machine.

\* \* \* \* \*